US007945132B2

(12) United States Patent
Vernooy et al.

(10) Patent No.: US 7,945,132 B2
(45) Date of Patent: May 17, 2011

(54) LASER AND PHOTODETECTOR COUPLED BY PLANAR WAVEGUIDES

(75) Inventors: David W. Vernooy, Sierra Madre, CA (US); Joel S. Paslaski, Alhambra, CA (US)

(73) Assignee: HOYA Corporation USA, San Jose, CA (US)

( * ) Notice: Subject to any disclaimer, the term of this patent is extended or adjusted under 35 U.S.C. 154(b) by 0 days.

(21) Appl. No.: 12/831,281

(22) Filed: Jul. 7, 2010

(65) Prior Publication Data

US 2010/0272395 A1 Oct. 28, 2010

Related U.S. Application Data

(62) Division of application No. 12/029,726, filed on Feb. 12, 2008, now Pat. No. 7,813,604, which is a division of application No. 10/836,642, filed on Apr. 29, 2004, now Pat. No. 7,330,619.

(60) Provisional application No. 60/466,799, filed on Apr. 29, 2003.

(51) Int. Cl.
*G02B 6/26* (2006.01)

(52) U.S. Cl. ................ 385/48; 385/39; 385/42; 385/43; 385/45

(58) Field of Classification Search ........................ None
See application file for complete search history.

(56) References Cited

U.S. PATENT DOCUMENTS

| | | | |
|---|---|---|---|
| 4,750,799 | A | 6/1988 | Kawachi et al. |
| 5,133,029 | A | 7/1992 | Baran et al. |
| 5,375,178 | A | 12/1994 | Van Der Tol |
| 5,418,867 | A | 5/1995 | Van Der Tol |
| 6,885,795 | B1 | 4/2005 | Hsu et al. |
| 7,095,928 | B2 | 8/2006 | Blauvelt et al. |
| 7,330,619 | B2 | 2/2008 | Vernooy et al. |
| 2003/0147591 | A1 | 8/2003 | Doi et al. |
| 2004/0165812 | A1 | 8/2004 | Blauvelt et al. |
| 2004/0264913 | A1 | 12/2004 | Vernooy et al. |
| 2009/0052841 | A1 | 2/2009 | Vernooy et al. |

OTHER PUBLICATIONS

Hu et al, "A Low-Loss and Compact Waveguide Y-Branch Using Refractive-Index Tapering", IEEE Photonics Technology Letters, vol. 9, No. 2, pp. 203-205 (Feb. 1997).

Rangaraj et al, "Low Loss Integrated Optical Y-Branch", Journal of Lightwave Technology, vol. 7, No. 5, pp. 753-758 (May 1989).

Shirafuji et al, "Transmission Characteristics of Optical Asymmetric Y Junction with a Gap Region", Jounrnal of Lightwave Technology, vol. 9, No. 4, pp. 426-429 (Apr. 1991).

*Primary Examiner* — Charlie Peng
*Assistant Examiner* — Mary A El-Shammaa
(74) *Attorney, Agent, or Firm* — David S. Alavi

(57) ABSTRACT

An optical apparatus comprises: a waveguide substrate; three planar optical waveguides formed on the substrate, each comprising a transmission core and cladding; a laser positioned to launch its optical output to propagate along the first waveguide; a photodetector positioned to receive an optical signal propagating along the second waveguide; and a lateral splitter core formed on the substrate for (i) transferring a first fraction of laser optical output propagating along the first waveguide to the second waveguide, and (ii) transferring a second fraction of the laser optical output propagating along the first waveguide to the third waveguide.

26 Claims, 7 Drawing Sheets

LASER AND PHOTODETECTOR COUPLED BY PLANAR WAVEGUIDES

RELATED APPLICATIONS

This application is a divisional of U.S. non-provisional application Ser. No. 12/029,726 filed Feb. 12, 2008 now U.S. Pat. No. 7,813,604, which is in turn a divisional of U.S. non-provisional application Ser. No. 10/836,642 filed Apr. 29, 2004 (now U.S. Pat. No. 7,330,619), which in turn claims benefit of U.S. provisional App. No. 60/466,799 filed Apr. 29, 2003, each of said provisional and non-provisional applications being hereby incorporated by reference as if fully set forth herein.

BACKGROUND

The field of the present invention relates to lasers, photodetectors, and optical planar waveguides. In particular, apparatus are described herein comprising a laser and photodetector optical coupled via planar optical waveguides on a substrate.

Recent progress in the design and fabrication of low-profile-core and/or thin-core planar optical waveguides, as disclosed in U.S. provisional App. No. 60/466,799 cited hereinabove, facilitates the fabrication of such planar optical waveguides for coupling a laser and a photodetector.

SUMMARY

An optical apparatus comprises: a waveguide substrate; first, second, and third planar optical waveguides formed on the substrate, each comprising a corresponding transmission core and cladding; a laser positioned to launch its optical output to propagate along the first transmission core toward its proximal end; a photodetector positioned to receive an optical signal propagating along the second transmission core away from its proximal end; and a lateral splitter waveguide formed on the substrate for (i) transferring a first fraction of the laser optical output propagating along the first transmission core toward its proximal end to the second transmission core to propagate away from its proximal end, and (ii) transferring a second fraction of the laser optical output propagating along the first transmission core toward its proximal end to the third transmission core to propagate away from its proximal end. The laser, photodetector, waveguides, and transferring means may be arranged so that a tracking ratio (defined hereinbelow) remains within about ±30%, about ±20%, or about ±10% of a nominal tracking ratio, and/or may be arranged to yield optical throughput (defined hereinbelow) greater than about 90% or about 95%.

The electronic signal generated by the photodetector in response to the first fraction of the laser optical output may serve as a laser monitor signal. A feedback circuit may be employed to control the laser in response to the laser monitor signal. A distal portion of the third planar waveguide may deliver the second fraction of the laser optical output to another waveguide, for example by end-coupling to an optical fiber. A wavelength-dependence of a tap or splitter ratio (defined hereinbelow) may be reduced, minimized, or substantially eliminated, or may be selected to at least partly compensate for other wavelength dependent properties of the apparatus, to yield a desired wavelength dependence of the tracking ratio.

Objects and advantages pertaining to a laser and a photodetector coupled by planar optical waveguides may become apparent upon referring to the disclosed embodiments as illustrated in the drawings and disclosed in the following written description and/or claims.

Figure 1A:
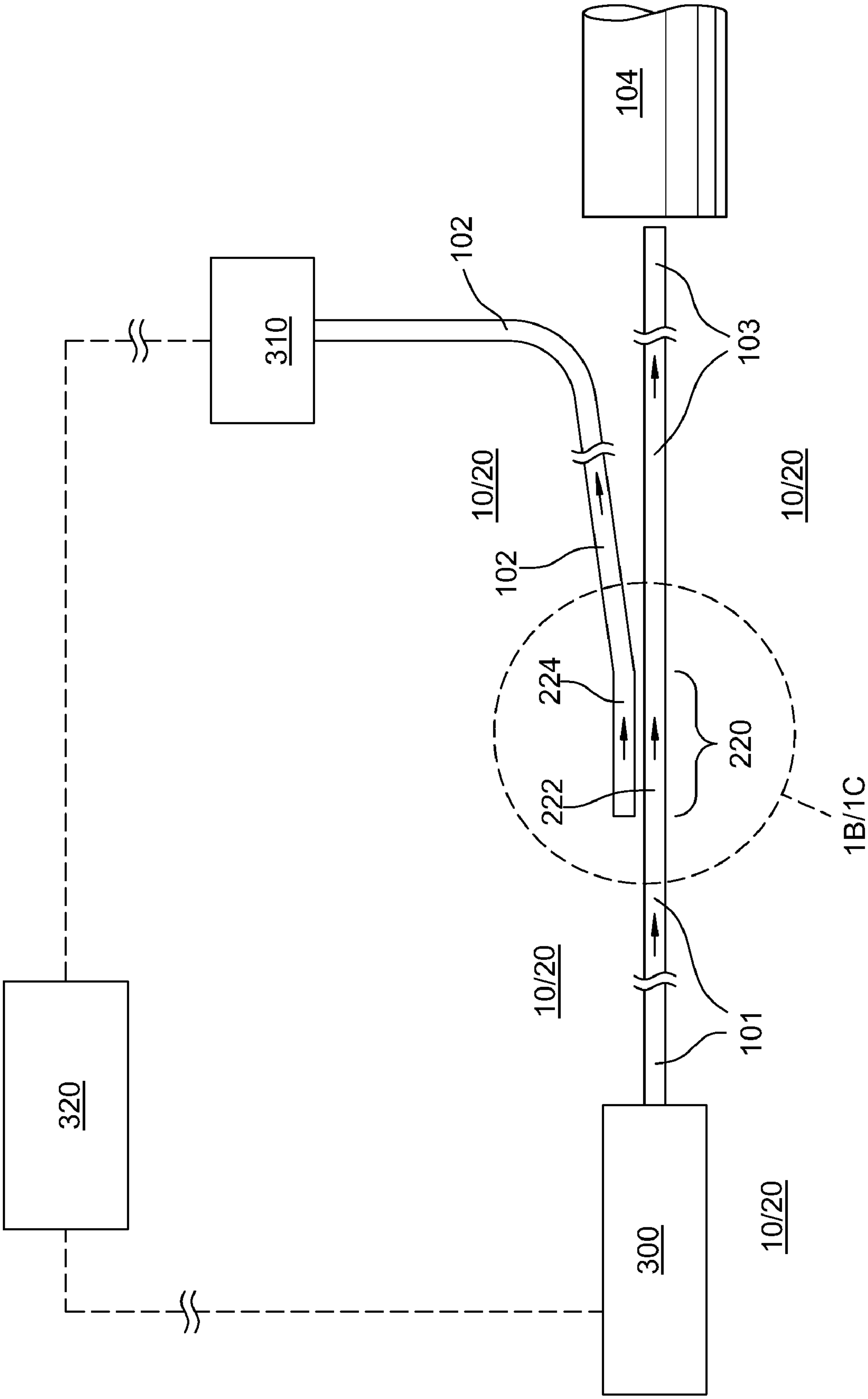
FIGS. 1A-1D are three plan views and one cross-section, respectively, of a laser, photodetector, and transverse-coupled optical tap on a substrate.
Figures 1B, 1C, 1D:
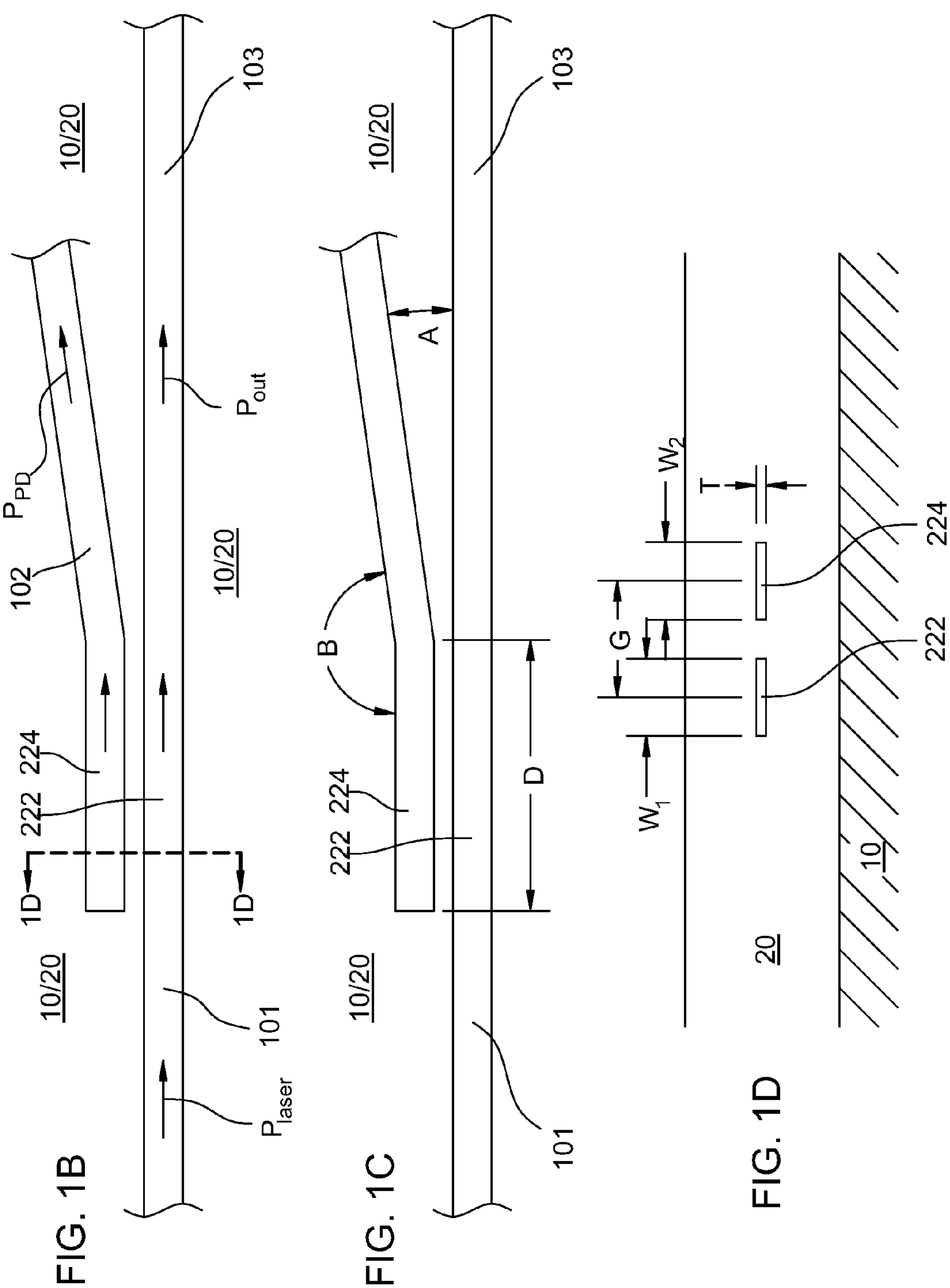

The embodiments shown in the Figures are exemplary, and should not be construed as limiting the scope of the present disclosure and/or appended claims. It should be noted that the relative sizes, proportions, and/or angles of structures shown in the Figures may in some instances be distorted to facilitate illustration of the disclosed exemplary embodiments.

DETAILED DESCRIPTION OF EMBODIMENTS

An optical apparatus comprises: a waveguide substrate 10; first, second, and third planar optical waveguides formed on the substrate, each comprising a corresponding transmission core 101, 102, or 103 and cladding 20; a laser 300 positioned to launch at least a portion ($P_{laser}$) of its optical output to propagate along the first transmission core 101 toward its proximal end; a photodetector 310 positioned to receive an optical signal propagating along the second transmission core 102 away from its proximal end; and means formed on the substrate for (i) transferring a first fraction ($P_{PD}$) of $P_{laser}$ to the second transmission core 102 to propagate away from its proximal end, and (ii) transferring a second fraction ($P_{out}$) of $P_{laser}$ to the third transmission core 103 to propagate away from its proximal end. The laser 300, photodetector 310, waveguides (and transmission cores 101, 102, and 103 thereof), and transferring means may be arranged so that a tracking ratio (defined hereinbelow) remains within about ±30%, about ±20%, or about ±10% of a nominal tracking ratio, and/or may be arranged to yield optical throughput (defined hereinbelow) greater than about 90% or greater than about 95%.

Optical coupling between laser source 300 and the transmission planar optical waveguide including transmission core 101 may be via optical end-coupling, via optical transverse-coupling (substantially modal-index-matched, substantially adiabatic, or otherwise), via an intermediate waveguide (not shown; according to the teachings, for example, of U.S. Pat. App. Pub. No. US 2003/0081902 A1, now U.S. Pat. No. 6,987,913), or by any other suitable arrangement. Optical coupling between photodetector 310 and the transmission planar optical waveguide including transmission core 102 may be via optical end-coupling (according to the teachings of U.S. application Ser. No. 10/661,709, now U.S. Pat. No. 6,992,276; according to the teachings of U.S. application Ser. No. 10/721,631, now U.S. Pat. No. 7,095,928; or otherwise), via optical transverse-coupling (substantially modal-index-matched, substantially adiabatic, or otherwise), via an intermediate waveguide (not shown; according to the teachings, for example, of U.S. Pat. App. Pub. No. 2003/0081902 A1, now U.S. Pat. No. 6,987,913), or by any other suitable arrangement.

The transferring means may comprise: (i) a pair of parallel spaced-apart tap core segments 222 and 224 (FIGS. 1A-1D); (ii) a branched splitter core 240 (FIGS. 2A-2E); or iii) a lateral splitter core 260 (FIGS. 3A-3D). The electronic signal generated by the photodetector 310 in response to the first fraction $P_{PD}$ of the laser optical output may serve as a laser monitor signal. The laser monitor signal may be used for apparatus diagnostics, for signal normalization, for controlling the laser via a feedback circuit 320, and/or for other purposes.

The optical power $P_{del}$ delivered by the third planar waveguide (with transmission core 103) comprises some or all of $P_{out}$. Typically, a distal portion of the third planar waveguide (with transmission core 103) may deliver at least a portion of $P_{out}$ to another waveguide for transmission, for example by end-coupling to an optical fiber 104, and the portion of $P_{out}$ delivered to or through the other waveguide may be denoted as $P_{del}$. The optical power $P_{del}$ may instead be delivered to a modulator or other active optical component, or to or through a free-space optical component or sub-assembly. $P_{del}$ and the electronic signal $S_{PD}$, generated by the photodetector in response to $P_{PD}$, may be used to define a tracking ratio $S_{PD}/P_{del}$. Some uses of the laser monitor signal (such as signal normalization and laser feedback control) are facilitated by reducing variation of the tracking ratio with wavelength. Wavelength dependence of the tracking ratio may arise from a variety of sources, including but not limited to: wavelength dependence of the photodetector responsivity, wavelength dependence of a tap ratio $P_{out}/P_{PD}$ (equivalently, a splitter ratio), wavelength dependence of optical throughput $(P_{PD}+P_{out})/P_{laser}$, other wavelength dependences, temperature dependences of optical, mechanical, and/or electronic properties, and so on. A wavelength-dependence of a tap or splitter ratio (defined hereinabove) may be reduced, minimized, or substantially eliminated, or may be selected or designed to at least partly compensate for other wavelength dependent properties of the apparatus, to yield a desired wavelength dependence of the tracking ratio. The desired wavelength dependence of the tracking ratio may include its reduction, minimization, or substantial elimination.

In the exemplary embodiment of FIGS. 1A-1D, the transferring means comprises a transverse-coupled optical tap 220, including tap core segments 222 and 224 within cladding 20. Tap core segment 222 connects the proximal ends of transmission cores 101 and 103. The $P_{out}$ fraction of $P_{laser}$ is transferred from transmission core 101 to transmission core 103 by propagation along tap core segment 222. The tap core segments 222 and 224 are positioned in a substantially parallel spaced-apart arrangement, thereby enabling optical transverse coupling therebetween, and are of length D. The volume between the tap core segments 222 and 224 is substantially filled with cladding 20. Tap core segment 224 and transmission core 102 form an obtuse angle B, while transmission core 102 and transmission core 103 form an acute angle A. As shown in the cross-section of FIG. 1D, the tap core segments 222 and 224 have respective widths $W_1$ and $W_2$ and thickness T. They are arranged at substantially the same height above substrate 10 within cladding 20, with separation G between their respective mode axes. The $P_{PD}$ fraction of $P_{laser}$ is transferred from transmission core 101 to transmission core 102 by optical transverse-coupling between tap core segments 222 and 224. A tap ratio $P_{out}/P_{PD}$ for the optical tap 220 may range between about 1:1 and about 20:1, or may range between about 5:1 and about 10:1. Any operationally acceptable tap ratio shall fall within the scope of the present disclosure.

The tap core segments 222 and 224 and the transmission cores 101, 102, and 103 may be arranged on the substrate 10 so as to yield a desired wavelength dependence (over a selected operating wavelength range for the laser) for the tracking ratio. If the desired wavelength dependence is reduced or minimal dependence on the wavelength, then it may be desirable to minimize the wavelength dependence of optical transverse-coupling between the tap core segments 222 and 224. Alternatively, it may be desirable to provide a wavelength-dependent tap ratio in order to at least partly compensate other wavelength dependent properties of the apparatus. The tap core segments 222 and 224 are shown in cross-section in FIG. 1D as low-profile cores. Each core may support a propagating optical mode, and a mode axis may be defined for each core as the centroid of the lowest-order mode supported by that core (in the absence of the other core). The thickness T and widths $W_1$ and $W_2$ of the tap core segments, the indices of the core and cladding materials, the distances D and G, and the angles A and B may be selected to yield the desired wavelength dependence for the tap ratio and/or tracking ratio, and/or to achieve a desired level of optical throughput. The core dimensions and the core/cladding indices determine the sizes and shapes of the respective supported modes, while the separation (or offset) G between the respective mode axes and the angle A determine the strength of optical transverse coupling and the length D and the angle A determine the longitudinal distance over which optical transverse-coupling acts to transfer optical power between the waveguides.

In an exemplary embodiment of FIGS. 1A-1D, cladding material 20 may comprise silica or doped silica (index at 1310 nm between about 1.45 and about 1.5), while the transmission cores 101/102/103 and tap core segments 222/224 may comprise silicon nitride or silicon oxynitride (index at 1310 nm between about 1.5 and about 2.0). The cores are typically less than about 250 nm in thickness, and may be less than 100 nm in thickness. The tap core segments 222/224 are arranged at substantially the same height above the substrate 10, and are typically less than about 2 μm wide and typically separated by less than about 3 μm between the respective mode axes. The tap core segments 222/224 may be less than about 1.2 μm wide, and may be separated by less than about 2 μm between the respective mode axes. Other suitable core/cladding materials and/or indices and/or suitable core dimensions/separations that similarly result in sufficiently great mode overlap shall fall within the scope of the present disclosure. The use of low-profile cores facilitates substantial filling of the volume between the tap core segments 222/224 with cladding 20 using a variety of fabrication and/or deposition processes. Thicker cores may render difficult such filling, may preclude use of certain fabrication/deposition processes, and/or may necessitate use of more complex fabrication/deposition sequences to achieve substantial filling. If the volume between the tap core segments is not substantially filled (i.e., if substantial voids remain in deposited cladding material, for example), the optical throughput of the optical tap may be degraded, and/or the properties of the tap (tap ratio, wavelength dependence, and so forth) may vary unpredictably from device to device. The optical throughput $(P_{PD}+P_{out})/P_{laser}$ should be larger than a minimum operationally acceptable level for a particular use or application (which may vary widely from instance to instance). It may be desirable to maintain the optical throughput of optical tap 220 above about 0.8 in some circumstances, or above about 0.9 about 0.95 in other circumstances. Any operationally acceptable level of optical throughput shall fall within the scope of the present disclosure.

The acute angle A between the transmission cores 102 and 103 may be between about 5° and about 10°, and may typically be between about 7° and about 9°. A larger angle A may result in reduced wavelength dependence of the tap ratio (by reducing or eliminating transverse-transfer between the waveguide cores as they diverge from one another) and may result in a more compact apparatus, but a larger angle A may also decrease optical throughput. For a particular operating wavelength range and particular set of core/cladding indices and core transverse dimensions and spacing, the angle A may be chosen: so as to yield the maximum optical throughput constrained by an operationally acceptable limit on the wavelength dependence of the tap ratio; so as to yield the minimum wavelength dependence of the tap ratio constrained by a minimum operationally acceptable optical throughput; or so as to achieve an operationally acceptable compromise between the wavelength dependence of the tap ratio and the optical throughput. All of these scenarios shall fall within the scope of the present disclosure.

The length D of the tap core segments 222/224 may be between about 2 μm and about 40 μm, and may typically be between about 5 μm and about 20 μm. The length of the tap core segments 102/202 is chosen to yield the desired tap ratio. To reduce wavelength dependence of the tap ratio, the tap core segments 222/224 may be substantially modal-index-matched. This may be achieved in a variety of ways, and any suitable pair of modal-index-matched tap core segments may fall within the scope of the present disclosure. Modal-index matching of the tap core segments 222/224 may be most readily achieved by forming them from the same material(s) with the same transverse size and shape, as in the exemplary embodiment of FIGS. 1A-1D with $W_1=W_2$.

A exemplary set of design parameters is: tap core segments 222/224 comprising silicon nitride within silica cladding 20; tap core segments 222/224 about 75 nm thick (T=75 nm) by about 1 μm wide ($W_1=W_2=1$ μm) and separated by about 1.6 μm (G=1.6 μm) between their mode axes (about 0.6 μm between their adjacent edges); tap core segments 222/224 about 7 μm long (D=7 μm); about 8° between transmission core segments 102/103 (A=)8° and about 172° between transmission core segments 101/102 (B=)172°. An apparatus fabricated to these parameters has been observed to yield $P_{PD}/P_{laser}$ of about 13.5%±0.4% over a wavelength range of about 1300 nm±60 nm, with optical throughput greater than about 0.9. Another exemplary set of design parameters is: tap core segments 222/224 comprising silicon nitride within silica cladding 20; tap core segments 222/224 about 70 nm thick (T=70 nm) by about 1.2 μm wide ($W_1=W_2=1.2$ μm) and separated by about 2.2 μm (G=2.2 μm) between their mode axes (about 1 μm between their adjacent edges); tap core segments 222/224 about 12 μm long (D=12 μm); about 8° between transmission core segments 102/103 (A=)8° and about 172° between transmission core segments 101/102 (B=)172°. Numerical simulations for an apparatus with these parameters yields a calculated $P_{PD}/P_{laser}$ of about 15%±0.6% over a wavelength range of about 1500 nm±100 nm, with optical throughput greater than about 0.9. Each of these exemplary designs yields a tracking ratio that remains within about ±10% of a nominal tracking ratio over the corresponding wavelength ranges.

In the exemplary embodiment of FIGS. 2A-2E, the transferring means comprises a branched splitter planar waveguide core 240 within cladding 20. The branch splitter core 240 includes a splitter main core segment 242 and splitter branch core segments 244 and 246, the two splitter branch core segments 244/246 being joined at their respective proximal ends with the proximal end of the splitter main core segment 242. The splitter main core segment 242, of length $D_1$, is connected at its distal end to the proximal end of the first transmission core 101 and tapers toward the first transmission core 101. The splitter first branch segment 244 is connected at its distal end to the proximal end of the second transmission core 102 and tapers toward the splitter main core segment 242. The splitter second branch segment 246 is connected at its distal end to the proximal end of the third transmission core 103 and tapers toward the splitter main core segment 242. The splitter branch core segments 244/246 are each of length $D_2$ in the symmetric embodiment of FIGS. 1A-1D. The first fraction $P_{PD}$ of $P_{laser}$ is transferred to the second transmission core 102 by optical propagation along the splitter main core segment 244 and the splitter first branch core segment 244. The second fraction $P_{out}$ of $P_{laser}$ is transferred to the third transmission core 103 by optical propagation along the splitter main core segment 242 and the splitter second branch core segment 246. The proximal portion of the first transmission core 101 forms obtuse angles B with respect to proximal portions of the second and third transmission cores 102 and 103, and proximal portions of the second and third transmission cores 102 and 103 form an acute angle A with respect to one another. A longitudinal slot 248 having substantially parallel edges separates the first and second branch core segments 244 and 246 from one another, the slot 248 extending from near the proximal ends of the second and third transmission cores 102 and 103 to the proximal end of the splitter main core segment 242. The slot 248 is substantially filled with cladding 20.

Figure 2A:
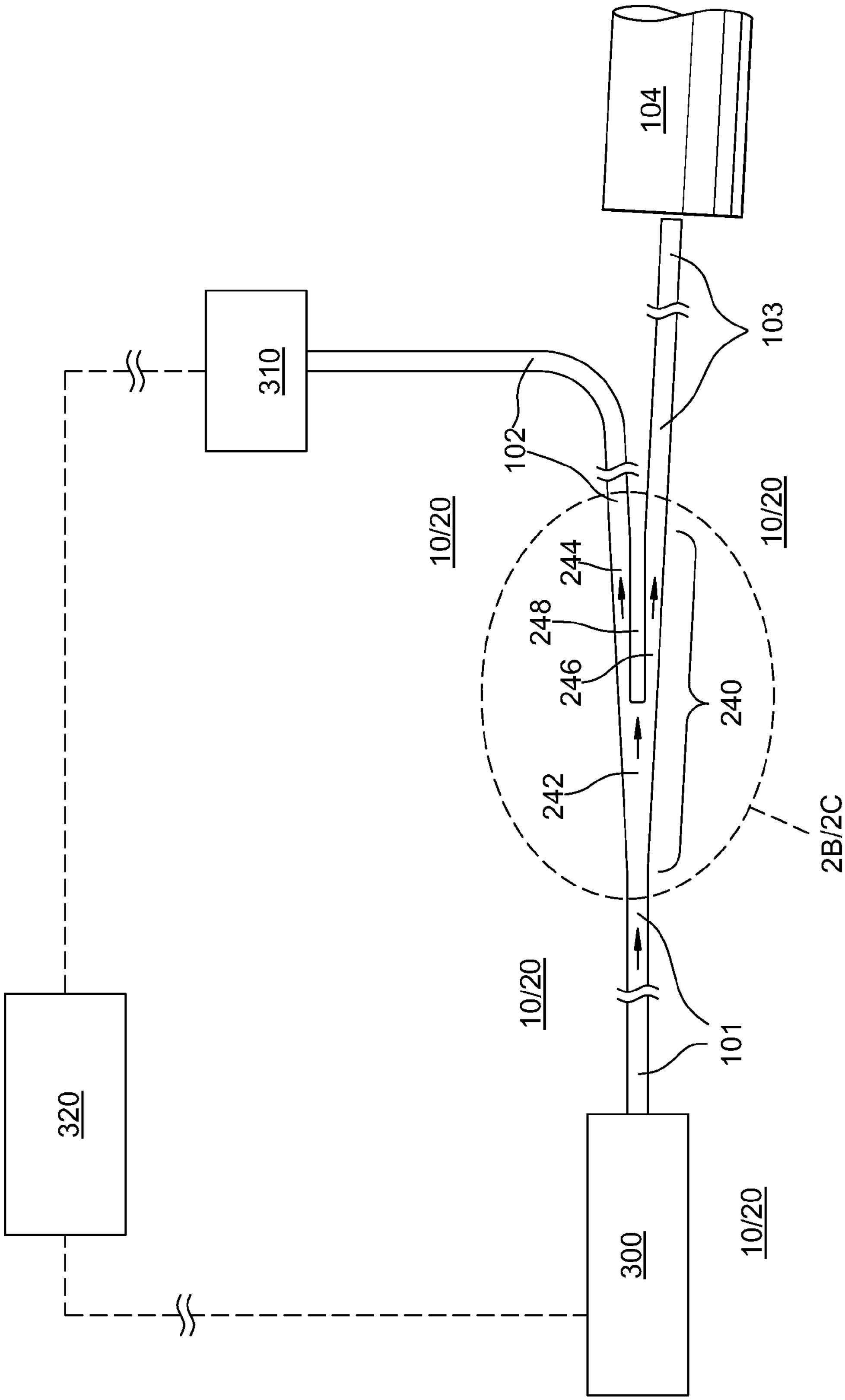
FIGS. 2A-2E are three plan views and two cross-sections, respectively, of a laser, photodetector, and branched optical splitter on a substrate.
Figures 2B, 2C, 2D, 2E:
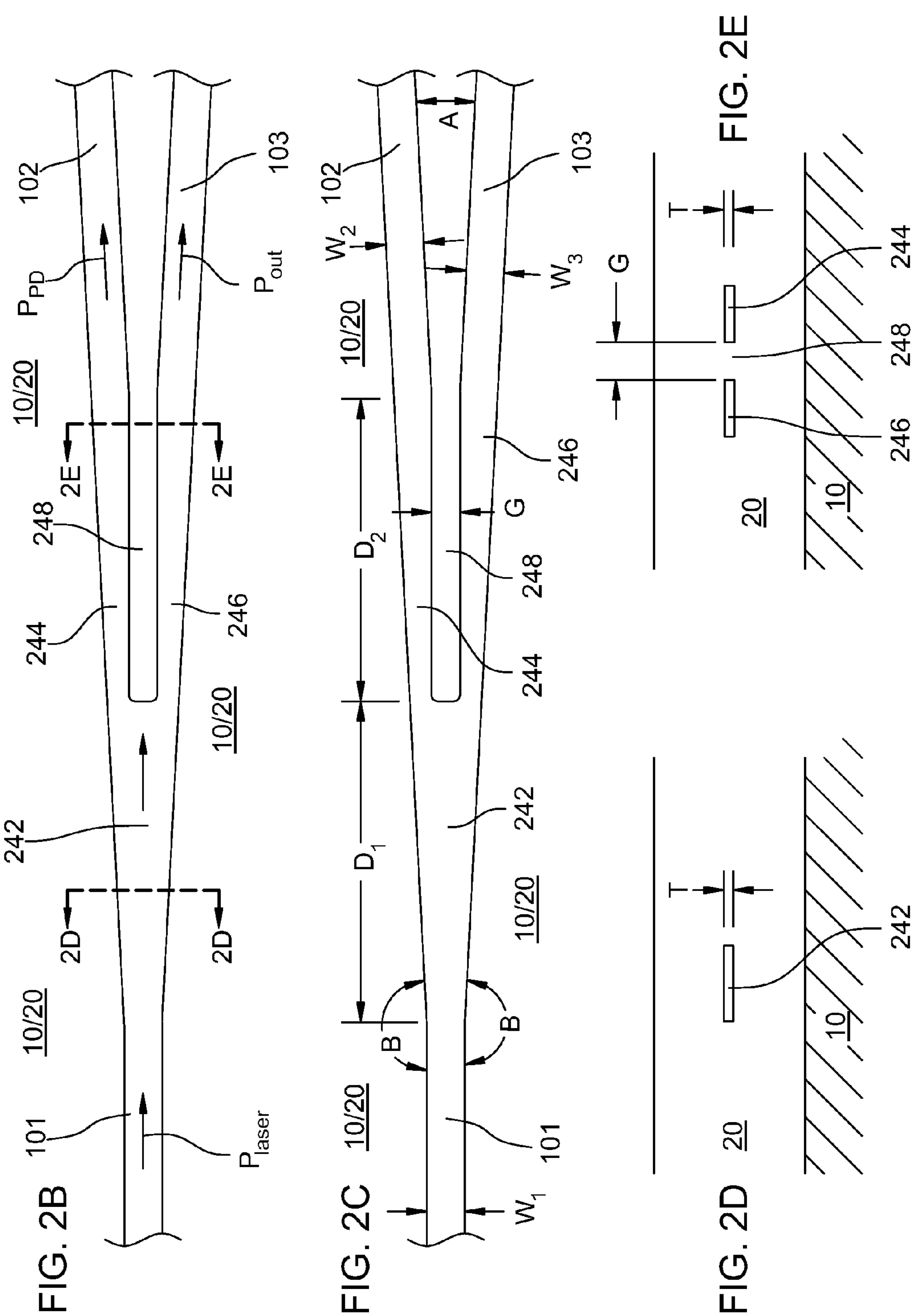
Figure 3A:
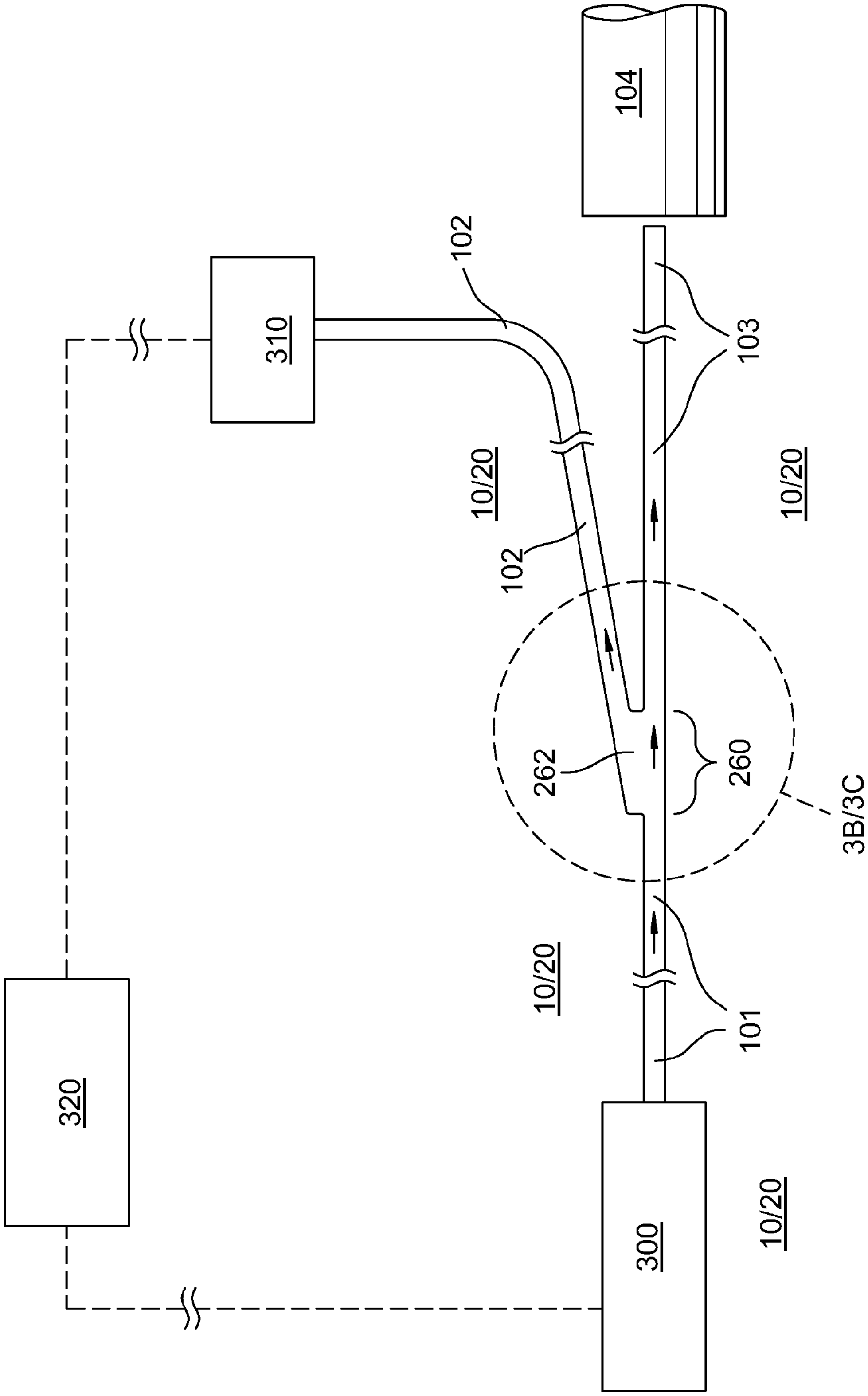
FIGS. 3A-3D are three plan views and one cross-section, respectively, of a laser, photodetector, and lateral optical splitter on a substrate.
Figures 3B, 3C, 3D:
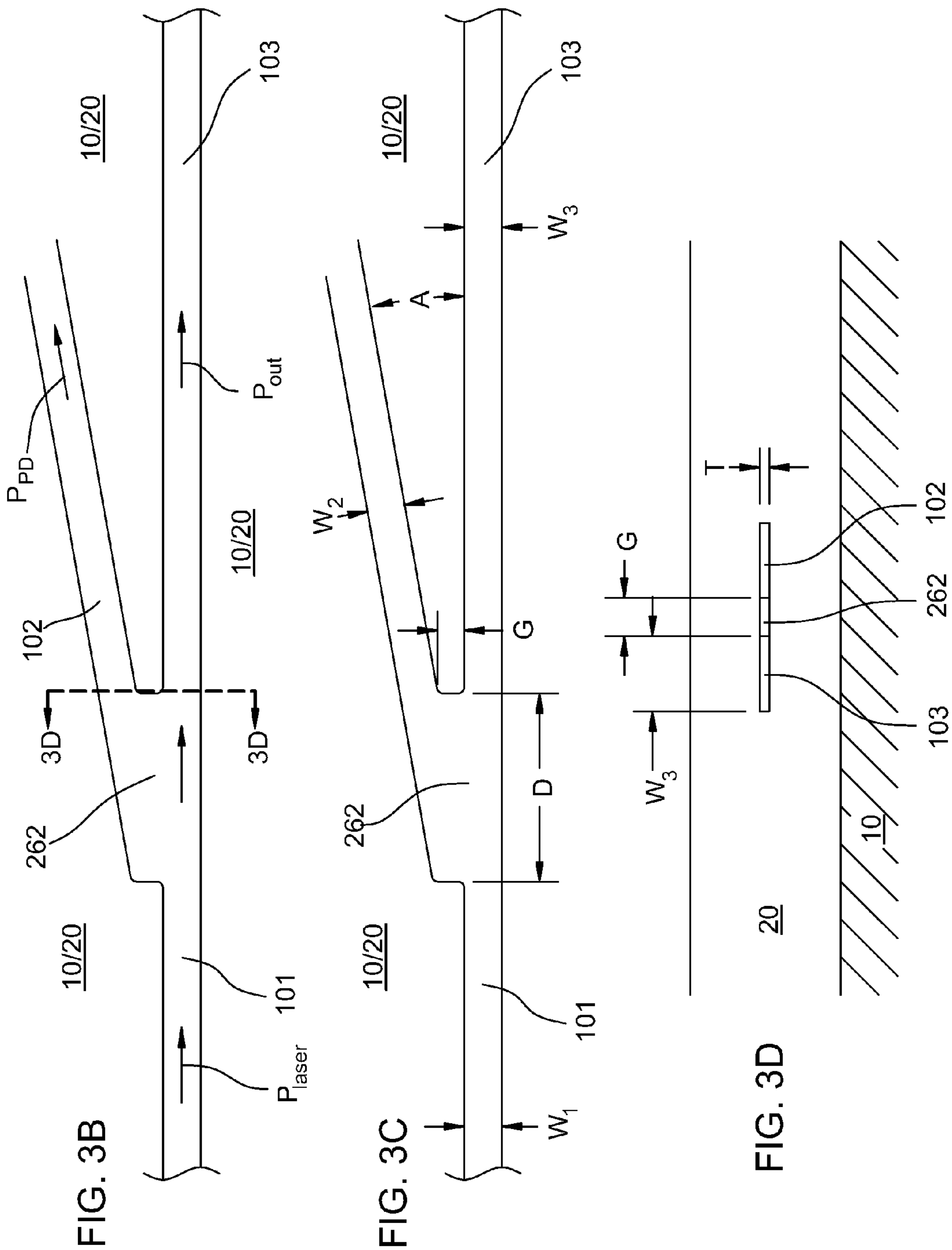

As shown in the cross-sections of FIGS. 2D-2E, the splitter core segments 242/244/246 are low-profile cores with thickness T, and are arranged at substantially the same height above substrate 10 within cladding 20. The width of slot 248 is G, which is typically (but not necessarily always) set by the spatial resolution of the lithographic or other processing used to form the branched splitter core 240. The length of the slot 248 is $D_2$ (the same as the lengths of the splitter branch core segments 244/246). For the symmetric branched splitter core shown in FIGS. 1A-1D, the splitter ratio $P_{out}/P_{PD}$ will be about 1:1, and The splitter ratio $P_{out}/P_{PD}$ for a symmetric branched splitter is substantially independent of wavelength, while the optical throughput $(P_{PD}+P_{out})/P_{laser}$ may vary with wavelength. Splitter ratios ranging between about 5:1 and about 1:5 may be achieved by lateral displacement (not shown) of: (i) transmission cores 102/103 and slot 248 relative to splitter core segments 242/244/246 and transmission core 101, or (ii) transmission cores 102/103, splitter branch core segments 244/246, and slot 248 relative to splitter core segment 242 and transmission core 101. Any operationally acceptable splitter ratio shall fall within the scope of the present disclosure. Lateral displacement of the slot 248 typically results in differing lengths for splitter branch core segments 244/246, and/or may result in wavelength-dependent splitter ratio and/or optical throughput.

The branched splitter core 240 and the transmission cores 101, 102, and 103 may be arranged on the substrate 10 so as to yield a desired wavelength dependence (over a selected operating wavelength range for the laser) for the tracking ratio. If the desired wavelength dependence is reduced or minimal dependence on the wavelength, then it may be desirable to minimize the wavelength dependence of the splitter ratio. Alternatively, it may be desirable to provide a wavelength-dependent splitter ratio in order to at least partly compensate other wavelength dependent properties of the apparatus. The thickness T and widths $W_1$, $W_2$, and $W_3$ of the transmission cores 101, 102, and 103, respectively (and the corresponding widths of the distal ends of the splitter core segments 242/244/246), the indices of the core and cladding materials, the distances G, $D_1$, and $D_2$, and the angles A and B may be selected to yield the desired wavelength dependence for the tap ratio and/or tracking ratio, and/or to achieve a desired level of optical throughput.

In an exemplary embodiment of FIGS. 2A-2E, cladding material 20 may comprise silica or doped silica (index at 1310 nm between about 1.45 and about 1.5), while the cores 101/102/103 and splitter core segments 242/244/246 may comprise silicon nitride or silicon oxynitride (index at 1310 nm between about 1.5 and about 2.0). The cores are typically less than about 250 nm in thickness, and may be less than 100 nm in thickness. The splitter core segments 242/244/246 are arranged at substantially the same height above the substrate 10. The widths of the transmission cores and corresponding distal ends of the splitter core segments are typically less than about 2 μm, and may be less than about 1.5 μm wide. Other suitable core/cladding materials and/or indices and/or suitable core dimensions shall fall within the scope of the present disclosure. Slot 248 is typically less than about 1 μm wide, and may typically (but not always) be formed near the lower limit of spatial resolution for the particular fabrication employed for forming core 240. The use of a low-profile cores facilitates substantial filling of the slot 248 with cladding 20 using a variety of fabrication and/or deposition processes. Thicker cores may render difficult such filling, may preclude use of certain fabrication/deposition processes, and/or may necessitate use of more complex fabrication/deposition sequences to achieve substantial filling. If the slot 248 is not substantially filled (i.e., if substantial voids remain in deposited cladding material, for example), the optical throughput of the optical tap may be degraded, and/or the properties of the splitter (splitter ratio, wavelength dependence, and so forth) may vary unpredictably from device to device. The optical throughput $(P_{PD}+P_{out})/P_{laser}$ should be larger than a minimum operationally acceptable level for a particular use or application (which may vary widely from instance to instance). It may be desirable to maintain the optical throughput of optical tap 220 above about 0.8 in some circumstances, or above about 0.9 or about 0.95 in other circumstances. Any operationally acceptable level of optical throughput shall fall within the scope of the present disclosure. It should be pointed out that a branched splitter core formed at the same spatial resolution without slot 248 typically exhibits optical throughput no better than about 0.85.

The acute angle A between the transmission core segments 102 and 103 may be between about 2° and about 8°, and may typically be between about 4° and about 6°. A larger angle A may result in reduced wavelength dependence of the splitter ratio (by reducing or eliminating transverse-transfer between the waveguide cores as they diverge from one another) and may result in a more compact apparatus, but a larger angle A may also decrease optical throughput. For a particular operating wavelength range and particular set of core/cladding indices and core transverse dimensions and spacing, the angle A may be chosen: so as to yield the maximum optical throughput constrained by an operationally acceptable limit on the wavelength dependence of the splitter ratio; so as to yield the minimum wavelength dependence of the splitter ratio constrained by a minimum operationally acceptable optical throughput; or so as to achieve an operationally acceptable compromise between the wavelength dependence of the splitter ratio and the optical throughput. All of these scenarios shall fall within the scope of the present disclosure. The total length $D_1+D_2$ of the splitter core segments 242/244/246 may be between about 10 μm and about 30 μm, and may typically be between about 15 μm and about 25 μm. The lengths are typically limited by the widths $W_1$, $W_2$, and $W_3$, the angle A, and the width G. For a given total length $D_1+D_2$ of the splitter core segments 242/244/246, an optimum distance $D_2$ may typically be found for which the optical throughput is near maximum.

A exemplary set of design parameters is: transmission cores 101/102/103 and splitter core segments 242/244/246 comprising silicon nitride within silica cladding 20 about 75 nm thick (T=75 nm); transmission cores 101/102/103 each about 1.5 μm wide ($W_1=W_2=W_3=1.5$ μm); slot 248 about 0.7 μm wide (G=0.7 μm); splitter core segments 242 about 20 μm long ($D_1=20$ μm); splitter core segments 244/246 and slot 248 each about 6 μm long ($D_2=6$ μm); about 5° between transmission cores 102/103 (A=)5° and about 177.5° between transmission cores 101 and 102 (B=)177.5°. Numerical simulations for an apparatus with these parameters yields a calculated $P_{PD}/P_{laser}$ of about 50%±5% over a wavelength range of about 1300 nm±80 nm, with optical throughput greater than about 0.95. This exemplary design yields a tracking ratio that remains within about ±10% of a nominal tracking ratio over the corresponding wavelength range.

In the exemplary embodiment of FIGS. 3A-3D, the transferring means comprises a lateral splitter 260, including a lateral splitter core segment 262 within cladding 20. Lateral splitter core 262 connects the proximal ends of the first and third transmission cores 101/103 in a substantially collinear arrangement, with a first lateral edge of the lateral splitter core 262 and corresponding first lateral edges of the first and third transmission cores 101/103 aligned substantially collinearly. The $P_{out}$ fraction of $P_{laser}$ is transferred from transmission core 101 to transmission core 103 by propagation along lateral splitter core 262, which is of length D. Transmission core 102 and transmission core 103 form an acute angle A, and transmission cores 101/102/103 have corresponding widths $W_1$, $W_2$, and $W_3$ and thickness T. They are arranged at substantially the same height above substrate 10 within cladding 20. A second lateral edge of the lateral splitter core 262 protrudes beyond the second lateral edges of transmission cores 101/103 and is connected to the proximal end of transmission core 102. The protruding second lateral edge of the lateral splitter core 262 extends a distance G between the adjacent edges of transmission cores 102 and 103. The $P_{PD}$ fraction of $P_{laser}$ is transferred from transmission core 101 to transmission core 102 by optical propagation along the lateral splitter core 262 past the second lateral edge thereof. A splitter ratio $P_{out}/P_{PD}$ for the optical tap 220 may range between about 1:1 and about 20:1, or may range between about 5:1 and about 10:1. Any operationally acceptable splitter ratio shall fall within the scope of the present disclosure.

The lateral splitter core 262 and the transmission cores 101, 102, and 103 may be arranged on the substrate 10 so as to yield a desired wavelength dependence (as already described hereinabove). The lateral splitter core 262 is shown in cross-section in FIG. 3D as a low-profile core. The thickness T and widths $W_1$, $W_2$, and $W_3$ of the transmission core segments, the indices of the core and cladding materials, the distances D and G, and the angle A may be selected to yield the desired wavelength dependence for the splitter ratio and/or tracking ratio, and/or to achieve a desired level of optical throughput.

In an exemplary embodiment of FIGS. 3A-3D, cladding material 20 may comprise silica or doped silica (index at 1310 nm between about 1.45 and about 1.5), while the transmission cores 101/102/103 and lateral splitter core 262 may comprise silicon nitride or silicon oxynitride (index at 1310 nm between about 1.5 and about 2.0). The cores are typically less than about 250 nm in thickness, and may be less than 100 nm in thickness. The transmission cores 101/102/103 are typically less than about 2 μm wide, while the distance G is typically less than about 1 μm, and may typically (but not necessarily always) be formed near the lower limit of spatial resolution for the particular fabrication processes employed for forming core 262. Other suitable core/cladding materials and/or indices and/or suitable core dimensions shall fall within the scope of the present disclosure. The use of low-profile cores facilitates substantial filling of the volume between the transmission cores 102/103 (near splitter core 262) with cladding 20 using a variety of fabrication and/or deposition processes. Thicker cores may render difficult such filling, may preclude use of certain fabrication/deposition processes, and/or may necessitate use of more complex fabrication/deposition sequences to achieve substantial filling. If the volume between the transmission core segments is not substantially filled (i.e., if substantial voids remain in deposited cladding material, for example), the optical throughput of the optical splitter may be degraded, and/or the properties of the splitter (splitter ratio, wavelength dependence, and so forth) may vary unpredictably from device to device. The optical throughput $(P_{PD}+P_{out})/P_{laser}$ should be larger than a minimum operationally acceptable level for a particular use or application (which may vary widely from instance to instance). It may be desirable to maintain the optical throughput of optical tap 220 above about 0.8 in some circumstances, or above about 0.9 or about 0.95 in other circumstances. Any operationally acceptable level of optical throughput shall fall within the scope of the present disclosure.

The acute angle A between the transmission cores 102 and 103 may be between about 5° and about 15°, and may typically be between about 8° and about 12°. A larger angle A may result in reduced wavelength dependence of the splitter ratio (by reducing or eliminating transverse-transfer between the waveguide cores as they diverge from one another) and may result in a more compact apparatus, but a larger angle A may also decrease optical throughput. For a particular operating wavelength range and particular set of core/cladding indices and core transverse dimensions and spacing, the angle A may be chosen: so as to yield the maximum optical throughput constrained by an operationally acceptable limit on the wavelength dependence of the splitter ratio; so as to yield the minimum wavelength dependence of the splitter ratio constrained by a minimum operationally acceptable optical throughput; or so as to achieve an operationally acceptable compromise between the wavelength dependence of the splitter ratio and the optical throughput. All of these scenarios shall fall within the scope of the present disclosure. The length D of the splitter core 262 may be between about 2 μm and about 10 μm, and may typically be between about 3 μm and about 8 μm. The length of the lateral splitter core 262 may be chosen to yield the desired splitter ratio.

A exemplary set of design parameters is: transmission core segments 101/102/103 and splitter core 262 comprising silicon nitride within silica cladding 20 about 75 nm thick (T=75 nm); transmission core segments 101/102/103 each about 1.4 μm wide ($W_1=W_2=W_3=1.4$ μm); minimum distance between transmission core segments 102/103 about 0.7 μm wide (G=0.7 μm); lateral splitter core 262 about 5.5 μm long (D=5.5 μm); about 10° between transmission core segments 102/103 (A=) 10°. Numerical simulation of an apparatus with these parameters yields a calculated $P_{PD}/P_{laser}$ of about 10%±0.5% over a wavelength range of about 1310 nm±50 nm with optical throughput greater than about 0.9. This exemplary design yields a tracking ratio that remains within about ±10% of a nominal tracking ratio over the corresponding wavelength range.

Figures 4A, 4B, 4C:
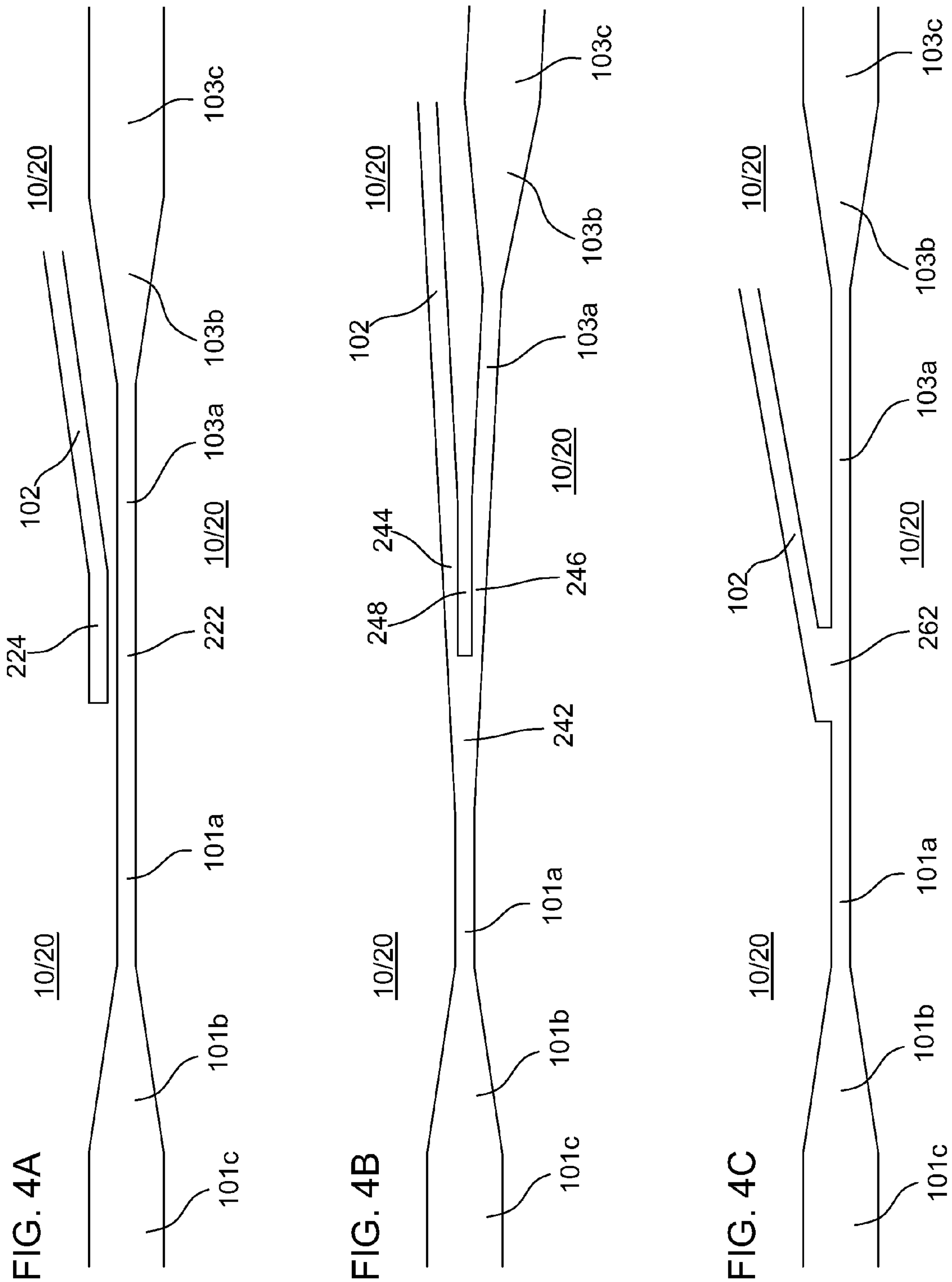
FIGS. 4A-4C are plan views of planar optical waveguides and a transverse-coupled tap, a branched splitter, and a lateral splitter, respectively.

While the exemplary dimensions for the transmission cores 101/103 are suitable for optical coupling with the exemplary tap core segments 222/224, branched splitter core 240, or lateral splitter 260, they may not be particularly suitable for transmitting optical signals between various location on substrate 10, or for optical coupling with other optical waveguides, optical components, and/or optical elements. The transmission cores 101/103 may be adapted for converting an optical mode suitable for such transmission and/or coupling into an optical mode suitable for optical tap 220, splitter 240, or splitter 260. Each of the transmission cores 101/103 may comprise corresponding proximal segments **101*a*/103*a*, corresponding tapered segments 101*a*/103*b*, and corresponding distal segments 101*c*/103*c* (FIGS. 4A-4C). The proximal segments 101*a*/103*a* are suitably sized and shaped for optical coupling to the optical tap 220, branched optical splitter 240, or lateral optical splitter 260. The distal segments 101*c*/103*c* support optical modes suitable for optical transmission and/or optical coupling elsewhere on the substrate 10 by the planar optical waveguides. The cross-section of the distal core segments may typically be larger than the cross-section of the proximal core segments in at least one transverse dimension. For example, in an example described herein above wherein tap core segment 222 is silicon nitride about 75 nm thick by about 1 to 2 μm wide, distal segments 101*c*/103*c* may be silicon nitride about 75 nm thick by about 2 to 6 μm wide. Tapered segments 101*b*/103*b* each taper toward the tap core segments, and may taper sufficiently gradually (over a distance of several tens of microns up to about 100 microns in this example) so as to provide substantially adiabatic optical transitions between distal segments 101*c*/103*c* and proximal segments 101*a*/103*a*** (i.e., optical transitions sufficiently gradual so as to substantially avoid optical coupling into unwanted optical modes).

Additional measures may be implemented to control the optical modes that reach tap 220, splitter 240, or splitter 260 along transmission core 101. The presence of any but the lowest-order optical mode will typically introduce unwanted (and often operationally unacceptable) wavelength variation into the tracking ratio. In may be desirable to suppress such higher-order modes before the optical power they carry reaches the tap or splitter. This may be achieved in any suitable fashion, including but not limited to: providing mode-stripping apertures or baffles along the transmission core(s); introducing bend segments into the transmission core(s) (which tend to be more lossy for higher-order modes); introducing segments into the transmission core(s) which strongly discriminate against all but the lowest-order mode.

The term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides (silicon, silicon-based, III-V, others), other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor (silicon, silicon-based, III-V, others), crystalline, silica or silica-based, other glasses, ceramic, metal, and myriad other examples not explicitly set forth herein which may nevertheless fall within the scope of the present disclosure and/or appended claims. For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta=2\pi n_{eff}/\lambda$. The effective index may also be referred to herein as a "modal index".

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Patent Application Pub. No. 2003/0081902 and/or U.S. provisional App. No. 60/466,799) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling).

The phrase "operationally acceptable" appears herein describing levels of various performance parameters of optical components and/or optical devices, such as optical coupling coefficient (equivalently, optical coupling efficiency), tap ratio, optical throughput, undesirable optical mode coupling, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, lower optical throughput may be an acceptable trade-off for achieving smaller wavelength dependence of the tap ratio in some instances, while higher optical throughput may be required in other instances in spite of greater wavelength dependence of the tap ratio. The "operationally acceptable" wavelength dependence of the tap ratio and the optical throughput therefore vary between the instances. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus comprising:

a waveguide substrate;

a first planar optical waveguide formed on the substrate comprising a first transmission core and cladding;

a second planar optical waveguide formed on the substrate comprising a second transmission core and cladding;

a third planar optical waveguide formed on the substrate comprising a third transmission core and cladding;

a laser positioned so as to launch at least a portion of its optical output to propagate along the first transmission core toward a proximal end thereof;

a photodetector positioned so as to receive at least a portion of an optical signal propagating along the second transmission core away from a proximal end thereof; and a lateral splitter planar optical waveguide core connecting the proximal ends of the three transmission cores, wherein:

the lateral splitter core is arranged to connect the proximal ends of the first and third transmission cores in a substantially collinear arrangement, with a first lateral edge of the lateral splitter core and corresponding first lateral edges of the first and third transmission cores aligned substantially collinearly;

a second lateral edge of the lateral splitter core protrudes beyond second lateral edges of the first and third transmission cores and is connected to the proximal end of the second transmission core;

proximal portions of the second and third transmission cores form an acute angle with respect to one another;

the lateral splitter core is arranged so that a first fraction of the laser optical output propagating along the first transmission core toward the proximal end thereof is transferred, by optical propagation along the lateral splitter core past the second lateral edge thereof, from the first transmission core to the second transmission core to propagate away from a proximal end thereof; and the lateral splitter core is arranged so that a second fraction of the laser optical output propagating along the first transmission core toward the proximal end thereof is transferred, by optical propagation along the lateral splitter core, from the first transmission core to the third transmission core to propagate away from a proximal end thereof.

2. The apparatus of claim 1 wherein the acute angle is greater than about 8° and less than about 12°.

3. The apparatus of claim 1 wherein the lateral splitter core is greater than about 3 μm long and less than about 8 μm long.

4. The apparatus of claim 1 wherein the second lateral edge of the lateral splitter core protrudes beyond the second lateral edge of the third transmission core by less than about 1 μm.

5. The apparatus of claim 1 wherein:

the cladding comprises silica or doped silica;

the proximal portions of the three transmission cores each comprise silicon nitride, are each about 75 nm thick and about 1.4 μm wide, and are arranged at substantially the same height relative to the substrate;

the lateral splitter core comprises silicon nitride about 75 nm thick;

the lateral splitter core is about 5.5 μm long;

the second lateral edge of the lateral splitter core protrudes beyond the second lateral edge of the third transmission core by about 0.7 μm; and the acute angle is about 10°.

6. The apparatus of claim 1 wherein:

the three transmission cores and the transferring means are each less than about 250 nm thick and each comprise silicon nitride or silicon oxynitride; and the cladding comprises silica or doped silica.

7. The apparatus of claim 6 wherein the three transmission cores and the transferring means are each less than about 100 nm thick.

8. The apparatus of claim 6 wherein:

the three transmission cores and the transferring means are arranged at substantially the same height relative to the substrate; and the three transmission cores are each less than about 2 μm wide.

9. The apparatus of claim 1 wherein a portion of the optical output of the laser is received by the photodetector, thereby generating a laser monitor electronic signal.

10. The apparatus of claim 9 further comprising a feedback circuit for controlling optical output power of the laser in response to the laser monitor electronic signal.

11. The apparatus of claim 1 wherein:

distal segments of the first and second transmission cores are larger in cross-sectional area than the proximal segments thereof; and a segment of each of the first and second transmission cores tapers in at least one transverse dimension toward the proximal end thereof.

12. The apparatus of claim 11 wherein the tapered segments of the first and second transmission cores are tapered sufficiently gradually so as to provide substantially adiabatic optical transitions between corresponding proximal and distal segments of the first and second transmission cores.

13. The apparatus of claim 1 further comprising another optical waveguide optically coupled with the third planar optical waveguide at a distal portion thereof, so as to receive the delivered optical power of the second fraction of the laser optical output.

14. The apparatus of claim 13 wherein the other optical waveguide comprises an optical fiber end-coupled to a distal end of the third planar optical waveguide.

15. The apparatus of claim 1 wherein:

a ratio of an electronic signal produced by the photodetector in response to the first fraction of the laser optical output optical power to a delivered optical power of the second fraction of the laser optical output defines a tracking ratio; and the laser, photodetector, the three planar optical waveguides, and the transferring means are arranged so that the tracking ratio remains between about 0.7 times a nominal tracking ratio and about 1.3 times the nominal tracking ratio over a selected operating wavelength range for the laser.

16. The apparatus of claim 15 wherein the laser, photodetector, the three planar optical waveguides, and the transferring means are arranged so that the tracking ratio remains between about 0.8 times a nominal tracking ratio and about 1.2 times the nominal tracking ratio over a selected operating wavelength range for the laser.

17. The apparatus of claim 15 wherein the laser, photodetector, the three planar optical waveguides, and the transferring means are arranged so that the tracking ratio remains between about 0.9 times a nominal tracking ratio and about 1.1 times the nominal tracking ratio over a selected operating wavelength range for the laser.

18. The apparatus of claim 15 wherein a wavelength dependence of a ratio of the optical power of the first fraction of the laser optical output to the optical power of the second fraction of the laser optical output is selected so as to at least partly compensate at least one other wavelength-dependent property of the apparatus, thereby yielding a desired wavelength dependence of the tracking ratio.

19. The apparatus of claim 1 wherein:

a ratio of a sum of optical powers of the first and second fractions of the laser optical output to optical power of the laser optical output propagating along the first transmission core defines an optical throughput; and the three planar optical waveguides and the transferring means are arranged on the substrate so that the optical throughput is greater than about 0.9 over a selected operating wavelength range for the laser.

20. The apparatus of claim 19 wherein the three planar optical waveguides and the transferring means are arranged on the substrate so that the optical throughput is greater than about 0.95 over a selected operating wavelength range for the laser.

21. A method, comprising:

launching at least a portion of optical output of a laser to propagate along a first transmission core toward a proximal end thereof, the first transmission core and cladding forming a first planar optical waveguide on a waveguide substrate;

transferring a first fraction of the laser optical output propagating along the first transmission core toward the proximal end thereof to a second transmission core to propagate away from a proximal end thereof, the second transmission core and cladding forming a second planar optical waveguide on the waveguide substrate;

transferring a second fraction of the laser optical output propagating along the first transmission core toward the proximal end thereof to a third transmission core to propagate away from a proximal end thereof, the third transmission core and cladding forming a third planar optical waveguide on the waveguide substrate; and receiving with a photodetector at least a portion of the first fraction of the laser optical output propagating along the second transmission core away from the proximal end thereof, thereby generating a laser monitor electronic signal, wherein:

the first and second fractions are transferred by a lateral splitter planar optical waveguide core connecting the proximal ends of the three transmission cores;

the lateral splitter core connects the proximal ends of the first and third transmission cores in a substantially collinear arrangement, with a first lateral edge of the lateral splitter core and corresponding first lateral edges of the first and third transmission cores aligned substantially collinearly;

the second fraction of the laser optical output is transferred from the first transmission core to the third transmission core by optical propagation along the lateral splitter core;

a second lateral edge of the lateral splitter core protrudes beyond second lateral edges of the first and third transmission cores and is connected to the proximal end of the second transmission core;

the first fraction of the laser optical output is transferred from the first transmission core to the second transmission core by optical propagation along the lateral splitter core past the second lateral edge thereof; and proximal portions of the second and third transmission cores form an acute angle with respect to one another.

22. The method of claim 21 further comprising controlling optical output power of the laser in response to the laser monitor electronic signal.

23. The method of claim 21 wherein:

distal segments of the first and second transmission cores are larger in cross-sectional area than the proximal segments thereof; and a segment of each of the first and second transmission cores tapers in at least one transverse dimension toward the proximal end thereof.

24. The method of claim 23 wherein the tapered segments of the first and second transmission cores are tapered sufficiently gradually so as to provide substantially adiabatic optical transitions between corresponding proximal and distal segments of the first and second transmission cores.

25. The method of claim 21 further comprising receiving into another optical waveguide optically coupled with the third planar optical waveguide at a distal portion thereof delivered optical power of the second fraction of the laser optical output.

26. The method of claim 25 wherein the other optical waveguide comprises an optical fiber end-coupled to a distal end of the third planar optical waveguide.

* * * * *